United States Patent [19]

Kuenzi

[11] Patent Number: 5,931,599
[45] Date of Patent: Aug. 3, 1999

[54] CONNECTING DEVICE

[75] Inventor: Stephan Kuenzi, Thun, Switzerland

[73] Assignee: USM U. Scharer Sohne AG, Musingen, Switzerland

[21] Appl. No.: 08/919,217

[22] Filed: Aug. 28, 1997

[30] Foreign Application Priority Data

Aug. 30, 1996 [CH] Switzerland ............... 2143/96

[51] Int. Cl.$^6$ ...................................... F16B 2/14

[52] U.S. Cl. .................. 403/374.4; 403/235; 403/297

[58] Field of Search ...................................... 403/297, 234, 403/235, 237, 190, 191, 370, 368, 374.3, 374.4, 170, 174, 178, 374.1

[56] References Cited

U.S. PATENT DOCUMENTS

| H906 | 4/1991 | Baggett et al. ................. 403/374.4 X |
| 3,787,131 | 1/1974 | Reachek .................................. 403/234 |
| 4,365,907 | 12/1982 | Berry ...................................... 403/12 |
| 4,555,199 | 11/1985 | Maier et al. ............................ 403/370 |
| 4,643,609 | 2/1987 | Biass ................................... 403/368 X |
| 5,464,299 | 11/1995 | Scharer et al. ......................... 403/297 |

FOREIGN PATENT DOCUMENTS

| 455945 | 11/1991 | European Pat. Off. .............. 403/297 |
| 2934795 | 3/1980 | Germany ............................... 403/297 |

Primary Examiner—Harry C. Kim

[57] ABSTRACT

A connecting device, in particular, for connecting two rod elements, has an expansion wedge construction that can be clamped in a tube-shaped end of the first rod element by expansion and that can be connected with the second rod element via a connecting piece. The expansion wedge construction includes an expansion mandrel and an expansion casing that can be engaged on the expansion mandrel. Expansion mandrel and expansion casing have an oval axial cross-section in such a manner that the wedge surfaces, which are formed in the area of the strong curvature between expansion casing and expansion mandrel, essentially are no smaller than the corresponding force locking surfaces that are made on an outside wall in the area of a strong curvature. Wedge-shaped wall thickenings of the casing are made in mirror-symmetry fashion on the inside of the surface area are molded-on in the mutually dialectically opposite areas with strong curvature. Predisposed (intentional formed) rupture points are provided in mirror-symmetry fashion with respect to each other on the flat areas of the surface area that are unstressed in the radial direction.

12 Claims, 2 Drawing Sheets

CONNECTING DEVICE

TECHNICAL FIELD

This invention relates to the connecting device, in particular, for connecting two broad elements, with an expanding wedge construction, which can be clamped together with a tube-shaped end of the first rod element by means of expansion and that can be connected with the second rod element via a connecting piece, so that the expansion wedge construction will comprise an expansion mandrel and an expansion casing that can be stuck on the expansion mandrel.

STATE OF THE ART

A connecting design of the kind mentioned initially is known, for example, from U.S. Pat. No. 4,921,370. Here, a support is provided with a radially penetrating borehole for a draw spindle. A two-part cylindrical expansion system, with an expansion mandrel and an expansion casing, is provided for the attachment of a tube-shaped strut. A connecting surface, which is adapted to the cylindrical surface of the support, is made at one end of the expansion system. The expansion mandrel is formed by a segment that is tapered in the form of a truncated cone. A screw nut for the draw spindle is retained in the expansion casing. The draw spindle is screwed in through the borehole of the support and the first part of the expansion system, all the way through, into the above-mentioned screw nut. While applying tension, the expansion casing, which is open on one longitudinal side, is expanded radially and is wedged in the strut. The disadvantage in this connecting arrangement is represented by the fact that the draw spindle must run through the support. It is therefore impossible to attach several struts on the same level.

EP 0 455 945 B1 discloses another connecting arrangement. A retaining ring and a clamping wedge device are used in order to fasten a (for example, horizontal) strut upon a (for example, vertical) support. The one-piece retaining ring is so fashioned that it can be pushed upon the support with little play. The clamping wedge device, which is equipped on one side with a connecting piece and on the other side with an expansion wedge system, comes in two parts. The connecting piece, which is molded-on to one part and that has the shape of a fork, can be stuck astride upon the retaining ring so that the two fork arms will rest on the support to the side of the retaining ring. To cooperate with the second part of the expansion wedge system, the mentioned first part has a tube-shaped segment that is cut open obliquely to form a wedge surface. The second part is cut obliquely in a complementary fashion. To clamp the strut firmly in place, its end is pushed on the tube-shaped clamping wedge system. Using a draw spindle, which penetrates through the two wedge halves in a longitudinal direction and that, with one end, engages a radial screw borehole of the retaining ring, the second part can be pressed against the first part, in the process being forced to the side on account of the wedge surface and thus causing the expansion of the clamping wedge device.

Another fastening device is known from U.S. Pat. No. 4,365,907. It is intended for fastening a square tube upon the outside wall of a sustainer. The expansion system is formed by a middle part that has the shape of a conical pyramid and two side wedges that are arranged symmetrically thereto. The two side wedges rest against the inside wall of the square tube and are forced outward, through the middle part, when tension is applied. The draw spindle is inserted through a borehole in the sustainer, it passes between the side wedges, and engages a screw borehole of the middle part.

The wedge connections that are known from the state of the art cannot satisfy for various reasons. In some ways, assembly is too expensive and, partly, stability is insufficient.

DESCRIPTION OF INVENTION

The object of the invention is to provide a device of the kind mentioned initially that will ensure a stable connection. In particular, the expansion wedge construction is to permit optimum development of forces when tension is applied.

This problem is solved by the features of claim 1. According to the invention, the expansion mandrel and the expansion casing, in the axial cross-section, have such oval contours that the wedge surfaces—that are formed in the area of the apexes of the contours (between the expansion casing and the expansion mandrel)—will essentially be no smaller than the force-locking surfaces that are formed in the corresponding position on a surface area or on the outside wall of the expansion casing.

An important aspect of the invention consists in the fact that the sliding friction between the wedge surfaces, which extend at an incline with respect to the longitudinal axis, is very small when compared to the adhesive friction between the surface area and the inside wall of the tube due to the selected geometric arrangement. As tension is applied to the expansion wedge system, the expansion casing will first of all slide upon the expansion mandrel until the radial extent is so great that adhesion friction is brought into play. In the context of the invention, it is possible to work without any friction-increasing surface coatings (between the surface area and the inside wall of the tube).

In comparison to the symmetrically rotating wedge connection according to U.S. Pat. No. 4,921,370, this invention offers much more favorable surface ratios. Looking at the mentioned state of the art, the wedge surface necessarily has a smaller radius and consequently a smaller surface than does the surface area of the expansion casing. Accordingly, the surface pressure between the wedge surfaces is greater than on the surface area. Assuming equal friction coefficients, this means that the friction force on the wedge surfaces is a priori greater than on the surface area where—to provide a good connection—the force ratios should really be the exact opposite. Another negative aspect in the known wedge connection is represented by yet another disadvantage represented by a wedge surface that decreases (with increasing taper of the expansion wedge. In contrast to that, the surface ratios do not change in the axial direction in this invention.

Compared to the wedge connection known from EP 0 455 945 B1, the invention not only has a much larger wedge surface (and thus more favorable ratios as regards the friction forces), but there can likewise be no force components that would inhibit the connection. If, in the known wedge connection, toward the end of the process involved in applying tension, the two wedge halves, due to adhesion friction on the strut (see FIG. 2, there, reference 3d), begin to get stuck, then, as tension is further applied, one wedge half (11b) will force the strut against the base part (33a) while the other wedge half (11a) will hinder any further movement toward the base part. This leads to an undesirable force component in the opposite direction. In contrast to that, in the invention at hand, the tube-shaped end of the first rod element is always drawn against the second rod element unhindered.

The oval shape also offers the advantage that the wedge connection in the tube is self-positioning. By the way, the wedge connection according to the invention can be preassembled in the tube. Both of these advantages are unfamiliar to the state of the art according to U.S. Pat. No. 4,365,907. In the wedge connection described there, preassembly in the tube (see reference 2, there) is impossible because the draw spindle (15) must be tightened from the inside of tube (3). Because the expansion wedge construction itself is not pressed against tube (3) (but instead is independent of base part (17)), there is furthermore a considerable stability problem. By the way, in this objection likewise (see FIG. 2, there), the wedge surface is smaller than the compact surface with the inside wall of the tube (2).

The wedge surfaces and the force locking surfaces preferably have about the same curvature or the same curvature layout. The transition to the flat area of the contour can be smooth or discontinuous.

In the mutually diametrically opposite areas with strong curvature (apex area), wedge-shaped wall thickenings are molded-on, inside the wedge casing, made by way of mirror-symmetry with respect to each other. Intended fracture points are provided, arranged in mirror-symmetry fashion with respect to each other in the surface area, on the flat areas of the contour that are unstressed in the radial direction.

Longitudinal slits are provided, for example, to form the intended rupture points; these slits are limited at the ends by narrow bridges. As the casing is expanded, the bridges are stretched or broken. In place of the longitudinal slits, one can also provide reduced wall thicknesses. The two intended rupture points are to be so dimensioned that they will yield or break simultaneously under stress.

According to a particularly preferred embodiment, the wedge-shaped wall thickenings of the expansion casing are made of aluminum. At sufficiently high pressure, this material will adapt, on the one hand, to the inside wall of the rod and, on the other hand, to the outside wall of the expansion mandrel. Other materials with such properties are also preferred. The casing, for example, can be made as an aluminum pressure die casting piece. A steel plate is attached on the front so that the force, exercised by the draw spindle, will be distributed as well as possible upon the entire cross-section of the expansion casing. By the same token, the expansion mandrel can also be made as a one-part aluminum pressure die casting piece.

The expansion mandrel is preferably oval and is made in a mirror-symmetry fashion with respect to two mutually perpendicular planes that run through the longitudinal center axis. By means of this symmetry, one can ensure that, during expansion, the forces will appear in an optimum fashion diametrically with respect to each other and will lead to a symmetrical traction stress in the flat sides of the casing material.

A fork-shaped connection element is made, for example, on the expansion mandrel; this element can be stuck astride on one retaining ring that can be pushed upon the second rod element. This connection technique ensures high stability in a plane that is defined by the longitudinal axis of the second rod element. It furthermore offers the advantage that the first rod element can be attached any place on the second one because the latter does not need any wall penetrations for any kind of draw spindles.

It is important to ensure that the connecting device can be attached in the first rod so that it cannot be pushed away. An expedient for the purpose of obtaining this objective is represented by the circulating shoulder on the foot of the expansion mandrel. The strut can rest with its front on that shoulder. It also facilitates the precise positioning of the rod end before tension is applied to the wedge system.

A draw spindle is provided to apply tension to the expansion wedge construction; the head of that spindle can be supported on an end of the expansion casing that is opposite the connection piece and can be screwed into a screw borehole that is provided on the retaining ring.

Additional advantageous embodiments and feature combinations of the invention will result from the following detailed description and the totality of the patent claims.

BRIEF DESCRIPTION OF DRAWINGS

The drawings, used to explain the exemplary embodiment, show the following.

Basically, identical parts are provided with identical references in the figures.

WAYS OF IMPLEMENTING THE INVENTION

Figure 1A:
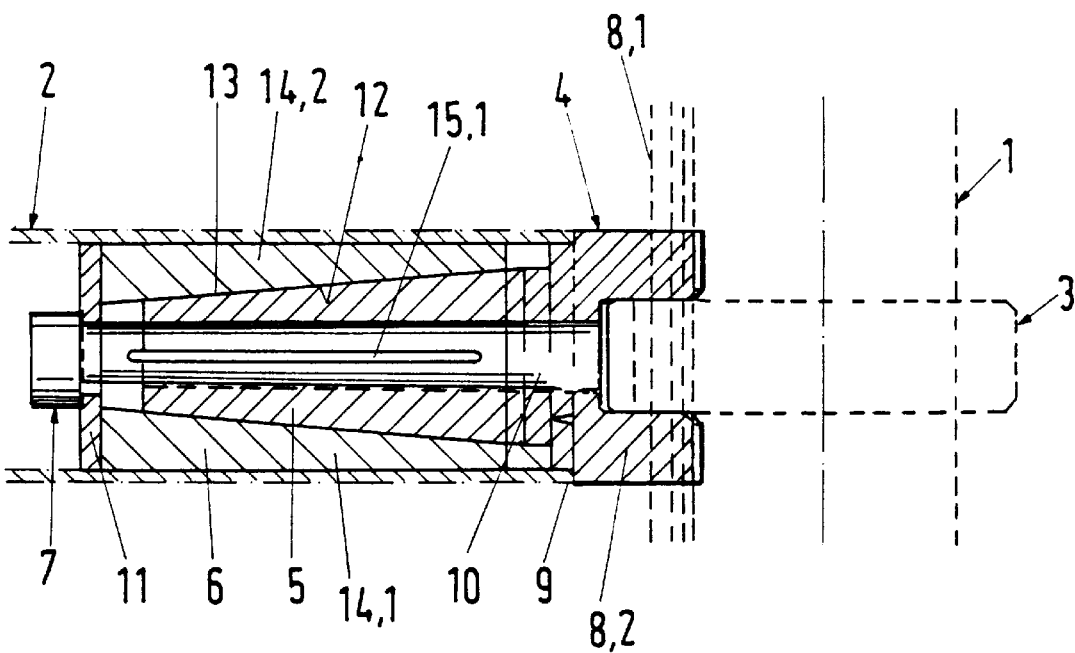
FIGS. 1a, b, a diagram illustrating a connecting construction according to the invention by way of two mutually perpendicular longitudinal profiles.

FIGS. 1a, b shows a support 1 that is connected to a strut 2. A retaining ring 3 encompasses support 1. It has several radial boreholes (not shown in the figures). A fork-shaped connecting piece 4 sits astride on retaining ring 3 and encloses the latter on top and below with its two fork arms 8.1, 8.2. On the front of the two fork arms 8.1, 8.2, there are concave connecting surfaces 17 that rest on the cylindrical surface of support 1.

A shoulder 9 is made on the reverse side of connecting piece 4; strut 2 can rest on that shoulder with its front. The shape of the tapered projection of the shoulder 9 is adapted with least possible play to the inside cross-section of strut 2. Advantageously, the side of the shoulder projection that faces toward the inside wall of strut 2 is made slightly conically. In that way, it is easier to put strut 2 on without having to get along without the closely fitting, low-play seat.

Figure 1B:
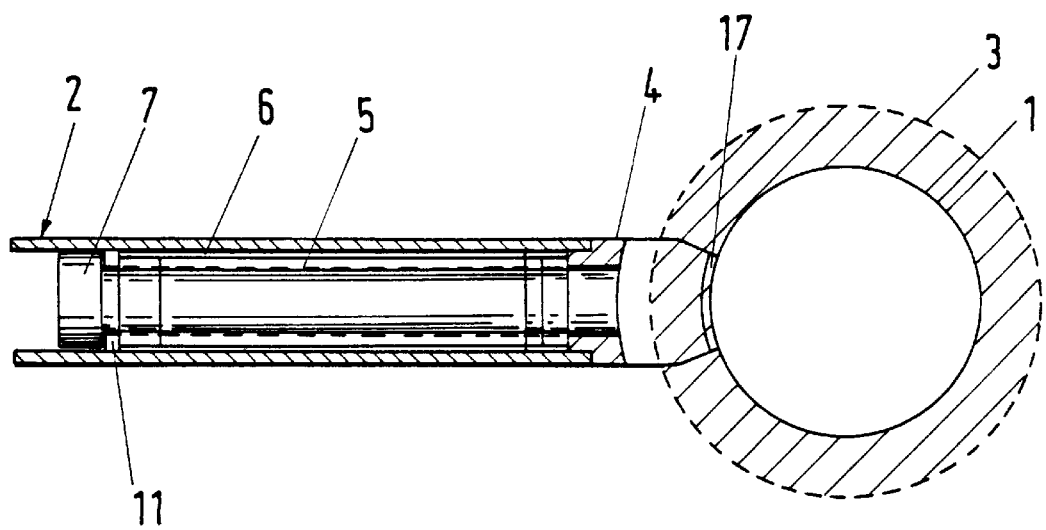

An expansion mandrel 5 is made on connecting piece 4 behind shoulder 9. It has an oval cross-section and is increasingly tapered to the rear in the longitudinal profile according to FIG. 1a. As one can see in FIG. 1b, the wall thickness in the direction of the small half-axis of the oval cross-section on the other hand remains constant. The tapering part of outside wall 12 forms a wedge surface with an angle of less than 10° (for example, 5°). An axial longitudinal borehole 10 runs through expansion mandrel 5.

An expansion wedge 6 is stuck upon expansion mandrel 5. The inside surface 13 of said casing is adapted to the shape of the outside surface 12. In other words, looking at it by way of an axial cross-section, it is oval, so that the long half-axis is increased from the rear to the front (that is to say, in the direction of connection piece 4). A steel plate 11 is arranged on the rear front of expansion casing 6. It has a central borehole. A draw spindle 7 is extended from the rear through the mentioned borehole and the longitudinal borehole 10, for which, to retaining ring 3, where it can be screwed into one of the previously mentioned radial screw boreholes. As draw spindle 7 is tightened, the wedge die shaped walls 14.1, 14.2, are driven apart in diametrically opposite directions, so that the expansion wedge construction will be firmly clamped in strut 2.

Figure 2:
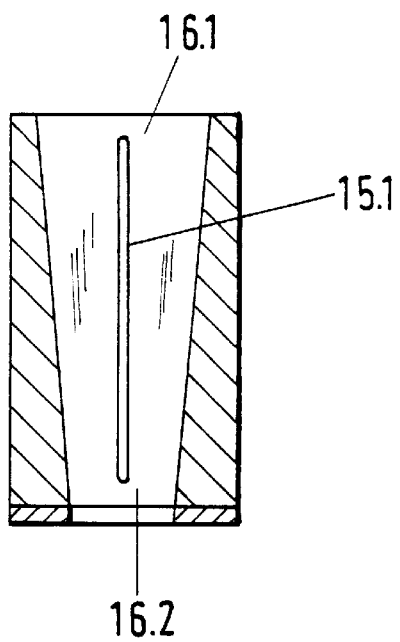
FIG. 2, a diagram illustrating an expansion casing according to the invention by way of an axial longitudinal profile.

As one can see in FIG. 2, expansion casing 6 has two longitudinal slits 15.1, 15.2. They are arranged in mirror-image fashion with respect to each other on the flat longitudinal sides of expansion casing 6 (that is to say, on the x axis in FIG. 3). FIG. 2 furthermore shows that, for example, longitudinal slit 15.1 is limited at its ends by bridges 16.1, 16.2.

(Longitudinal slit 15.2 is limited in the same manner by bridges to get a mirror-symmetry arrangement.)

Figure 3:
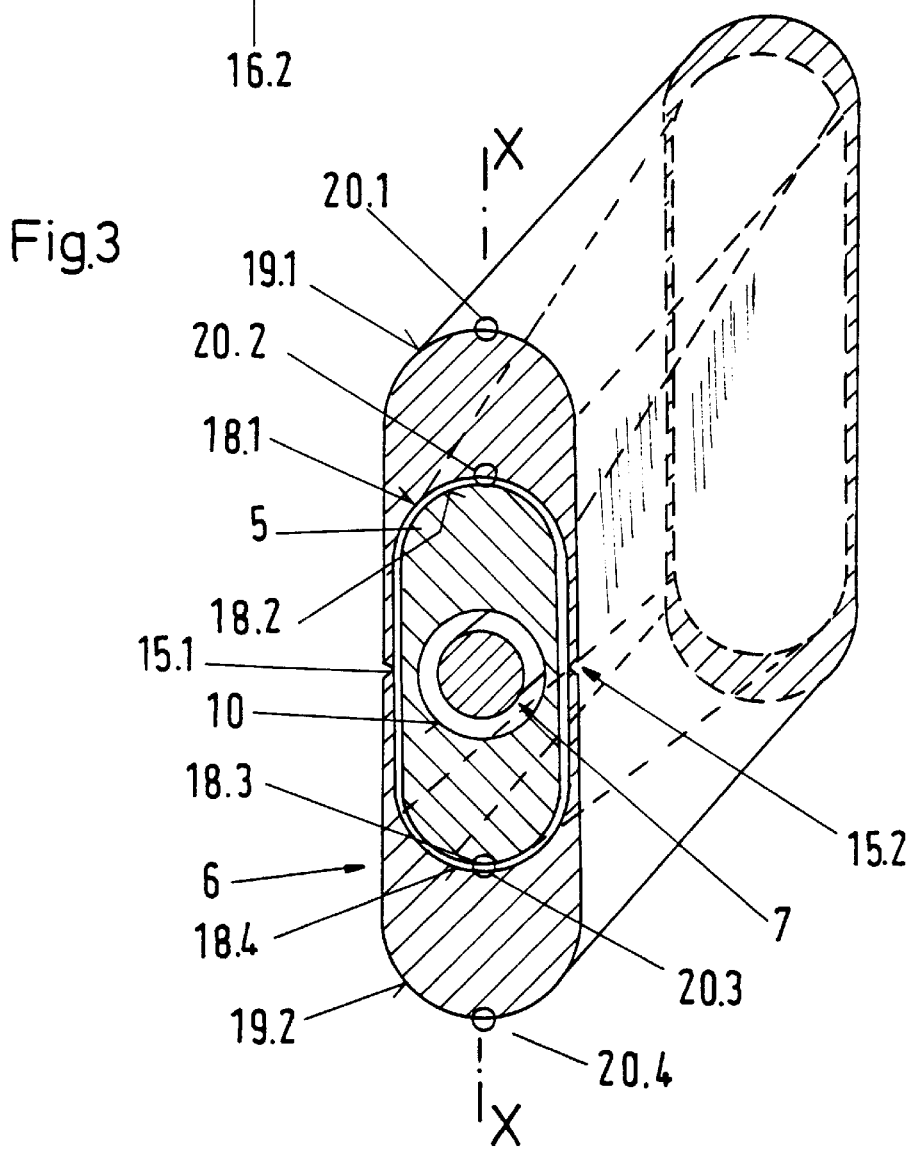
FIG. 3, a diagram to explain the basic principle.

FIG. 3 shows an axial cross-section at any desired point. Expansion casing 6 is shown in perspective for better orientation. Furthermore, expansion mandrel 5, longitudinal borehole 10, and draw spindle 7 are also drawn.

In keeping with the invention, the contours in this cross-section are oval so that, in the area of apexes 20.1–20.4, the force locking surfaces 19.1, 19.2, and the wedge surfaces 18.1–18.4 will be formed. The curved areas of the contours have roughly the same curvature radius or the same curvature layout. What has been said so far indicates that the wedge surfaces (that is to say, strictly speaking, their contours in cross-section) essentially are no smaller than the force locking surfaces (or their cross-section contours).

As one can see in FIG. 3, the cross-section surfaces do change in the direction of the longitudinal axis but the curvatures of the oval contours do not change.

As the casing is expanded, an expansion force is applied only in the small x-direction according to the invention. In the process, the force is developed in mirror-symmetry fashion with respect to the longitudinal center axis of the expansion wedge construction. Bridges 16.1, 16.2 are made so thin or narrow that the two longitudinal slits 15.1, 15.2 (due to the expansion of bridges 16.1, 16.2, possibly all the way to rupture) will be able to expand "synchronously," that is to say, simultaneously and to the same extent. Expansion casing 6 and expansion mandrel 5 are oval and made by way of a mirror-symmetry arrangement; in that way, one can ensure that both flat walls of expansion casing 6 will be expanded to the same extent and that the expansion force will act in an optimum fashion upon those wall parts of the strut that have a strong curvature (that is to say, a small curvature radius).

According to a preferred embodiment of the invention, expansion mandrel 5 and expansion casing 6 are made of aluminum. If a sufficiently high-pressure tension is applied, then the outside wall of the casing is applied to the inside wall of the tube strut (which typically consists of steel) and in this fashion ensures optimum connection.

The stability of the connection according to the invention last but not least is also connected with the fact that the expansion mandrel and the connection piece form a one-part molded piece. It must furthermore be noted that, as tension is applied to the expansion wedge construction, expansion casing 6 draws the end of rod 2 against shoulder 9. Due to the cross-section ratios according to the invention, it is possible to work with a comparatively small wedge angle of, for example, 5°. Both of the tension forces are thus conducted into the adhesion friction contact between the expansion casing and the inside wall of the tube (and are not used up in the wedge surface contact).

Summarizing, it should be noted that the invention provides a connection construction with high stressability and great assembly flexibility.

I claim:

1. A connecting device for connecting a first and a second rod element, comprising:
    a) an expansion wedge construction to be clamped in a force-locking manner by expansion in a tube-shaped end of the first rod element;
    b) a connecting piece to be connected with the second rod element;
    c) an expansion mandrel in the expansion wedge construction, said expansion mandrel having first wedge surfaces and
    d) an expansion casing to be engaged on the expansion mandrel, said expansion casing having second wedge surfaces contacting the first wedge surfaces and force locking surfaces that are formed in a surface area of the expansion casing and adapted contact the tube-shaped end of the first rod element; wherein
    e) said first and second wedge surfaces are in contact with each other,
    f) said first and second wedge surfaces have an oval contour in a cross-sectional view with respect to a longitudinal axis of the expansion wedge construction,
    g) the oval contour defining apexes and flat areas, wherein the flat areas are not stressed in a radial direction, and
    h) the wedge surfaces are formed in the area of the apexes and are essentially no smaller than the force locking surfaces that are formed in a corresponding axial position in a surface area of the expansion casing.

2. A connecting device according to claim 1 wherein the expansion case consist of aluminum and the expansion casing has a wedge-shaped wall thickness; and
    a steel plate is attached on the front of the wedge-shaped wall to support a tension element.

3. A connecting device according to claim 1, wherein the expansion mandrel, with respect to two mutually perpendicular planes that run through a longitudinal center axis of the expansion mandrel, is made in mirror-symmetry fashion.

4. A connecting device according to claim 1, wherein the connecting piece has a fork-shape on the expansion mandrel, so that it can be engaged astride on a retaining ring that can be pushed on the second rod element.

5. A connecting device according to claim 1, wherein the expansion mandrel is a one-part aluminum pressure die casting piece.

6. A connecting device according to claim 1, wherein the expansion mandrel has a circulating shoulder on which the front end of the first rod element can rest.

7. A connecting device according to claim 1, wherein a draw spindle is provided whose head can be supported on an end of the expansion casing, that is opposite to the connecting piece, and can be screwed into a screw borehole provided in a retaining ring.

8. A connecting device according to claim 1, wherein the wedge surfaces and the force locking surfaces have substantially the same curvature in a cross-sectional view.

9. A connecting device according to claim 1, further comprising wedge-shaped wall thickenings provided on the inside of the expansion casing in between the second wedge surfaces and the force-locking surfaces and arranged in a mirror-symmetry fashion in the area of the apexes.

10. A connecting device according to claims 1, wherein the expansion casing further comprises prepositioned rupture points arranged in a mutually mirror-symmetry fashion in the flat areas of the oval contour.

11. A connecting device according to claim 10, wherein the prepositioned rupture points are defined by longitudinal slits and bridges at the end of the longitudinal slits.

12. A connecting device for connecting a first and a second rod element, comprising:
    a) an expansion wedge construction to be clamped in a force-locking manner by expansion in a tube-shaped end of the first rod element;

b) a connecting piece to be connected with the second rod element;

c) an expansion mandrel in the expansion wedge construction, said expansion mandrel having first wedge surfaces and d) an expansion casing to be engaged on the expansion mandrel, said expansion casing having second wedge surfaces contacting the first wedge surfaces and force locking surfaces that are formed in a surface area of the expansion casing and adapted to contact the tube-shaped end of the first rod element; wherein e) said first and second wedge surfaces are in contact with each other, f) said first and second wedge surfaces have an oval contour in a cross-sectional view with respect to a longitudinal axis of the expansion wedge construction, g) the oval contour defining apexes and flat areas, wherein the flat areas are not stressed in a-radial direction, h) the wedge surfaces are formed in the area of the apexes and are essentially no smaller than the force locking surfaces that are formed in a corresponding axial position in a surface area of the expansion casing, i) the wedge surfaces and the force locking surfaces have about the same curvature in the cross-sectional view, and j) wedge-shaped wall thickenings provided on the inside of the expansion casing in between the second wedge surfaces and the force-locking surfaces and arranged in a mirror-symmetry fashion in the area of the apexes.

* * * * *